UNITED STATES PATENT OFFICE.

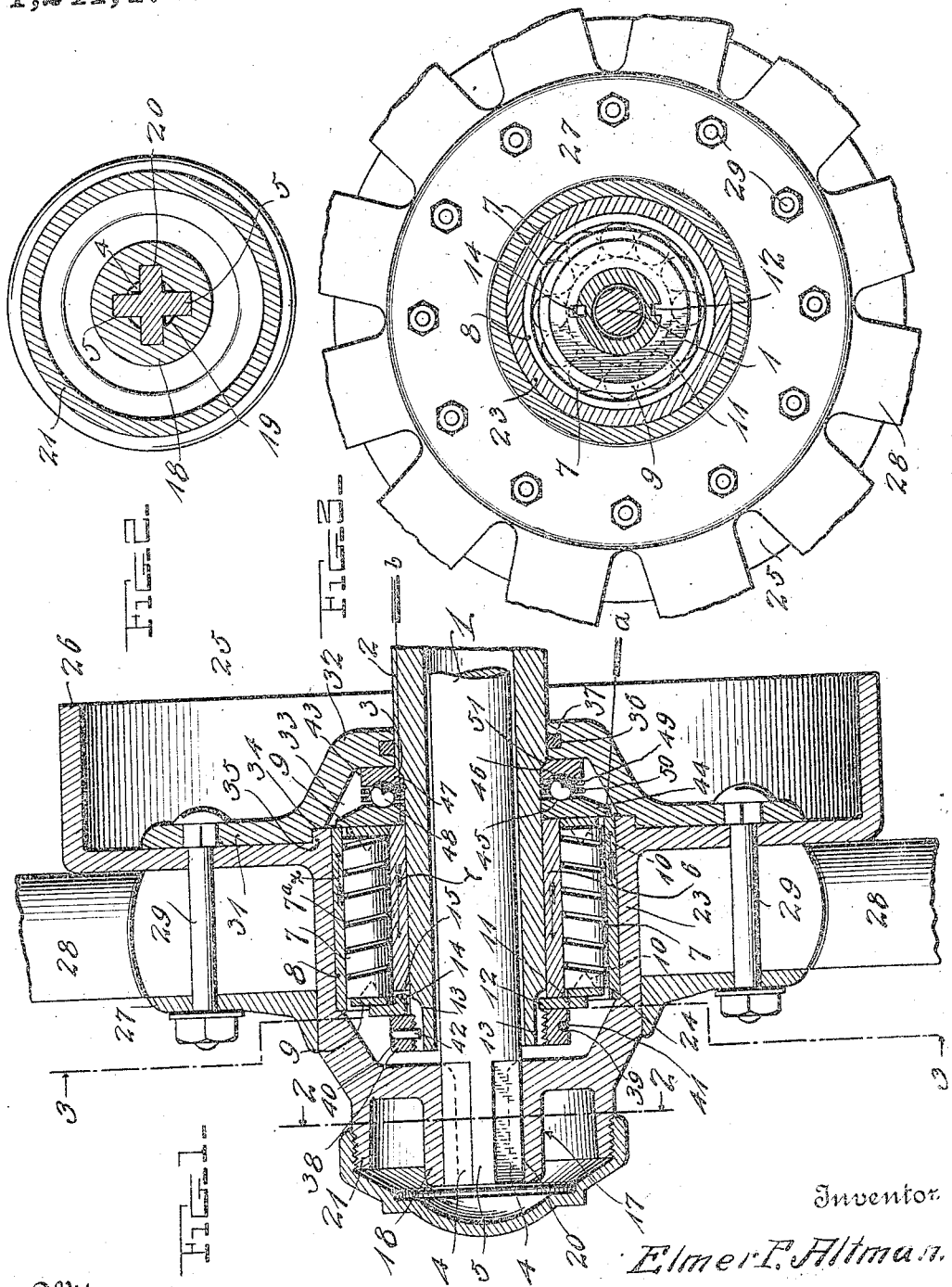

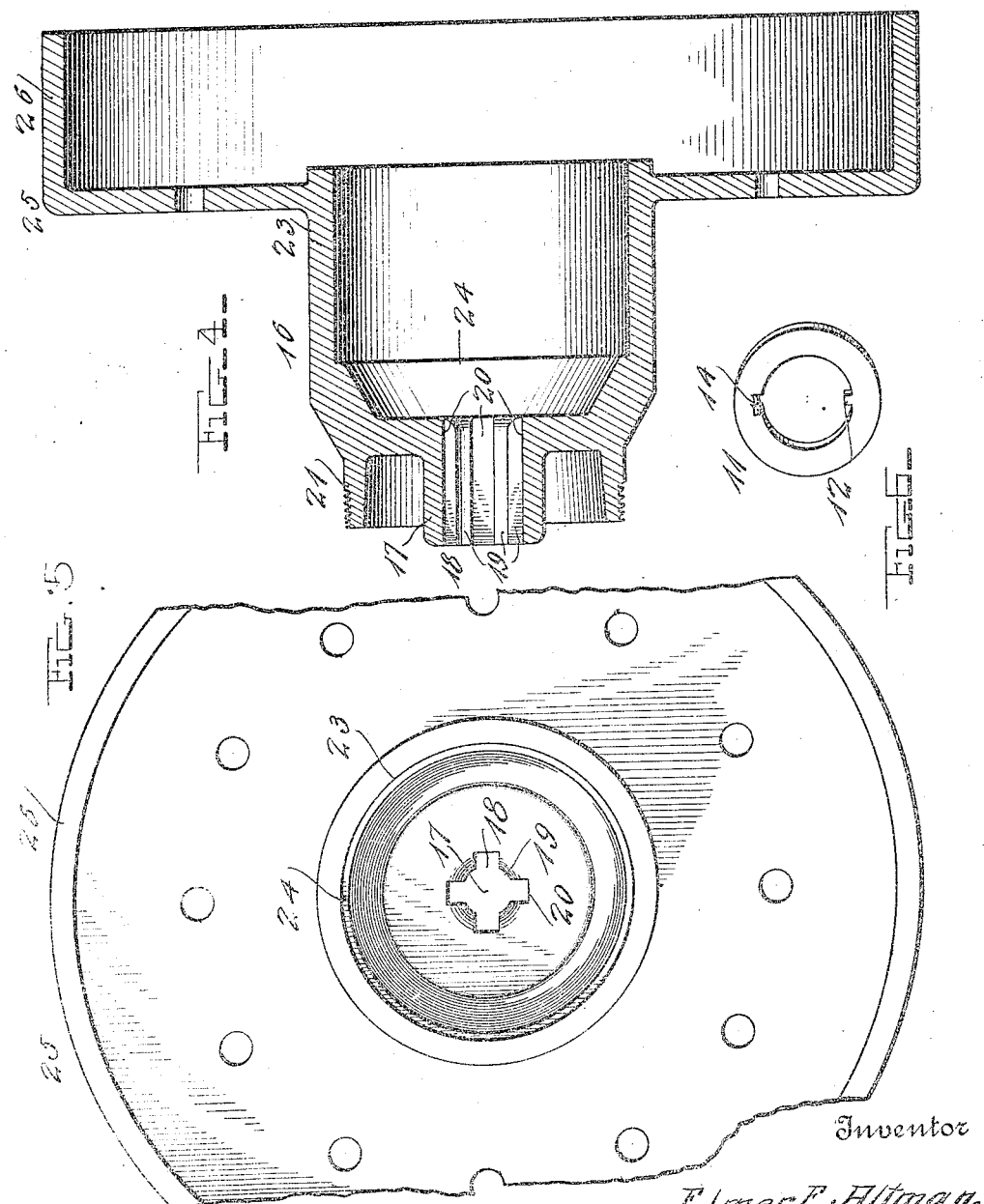

ELMER F. ALTMAN, OF MINNEAPOLIS, MINNESOTA, ASSIGNOR OF ONE-HALF TO ORIN M. OULMAN, OF MINNEAPOLIS, MINNESOTA.

WHEEL-HUB.

1,241,473.  Specification of Letters Patent.  Patented Sept. 25, 1917.

Application filed September 9, 1912, Serial No. 719,497. Renewed February 26, 1917. Serial No. 151,125.

*To all whom it may concern:*

Be it known that I, ELMER F. ALTMAN, a citizen of the United States, residing at Minneapolis, in the county of Hennepin and State of Minnesota, have invented certain new and useful Improvements in Wheel-Hubs; and I do declare the following to be a full, clear, and exact description of the invention, such as will enable others skilled in the art to which it appertains to make and use the same.

This invention relates to improvements in wheel hubs for driving axles.

One object is to provide a hub constructed in such manner that the spokes of the wheel may be removed and replaced without disturbing any other part of the wheel or hub, and wherein any size spokes may be employed.

A further object is to provide a driving hub in which the outer or unit portion may be readily separated and removed from the inner portion and bearings thereby affording free access to the latter to permit the same to be placed in position and adjusted on the axle in plain view of the operator.

With these and other objects in view, the invention consists of certain novel features of construction, combination and the arrangement of parts as will be hereinafter more fully described and claimed.

In the accompanying drawings:

Figure 1 is a central vertical longitudinal section of my improved hub.

Fig. 2 is a vertical cross sectional view on the line 2—2 of Fig. 1.

Fig. 3 is a similar view on the line 3—3 of Fig. 1.

Fig. 4 is a central vertical sectional view of the driving member of the hub.

Fig. 5 is a rear or inner side view of the same.

Fig. 6 is a detail perspective view of the locking washer for holding the inner bearing sleeve against turning.

Referring more particularly to the drawings 1 denotes the driving axle to which my improved hub is attached, and 2 denotes the tubular stationary axle on which the hub is revolubly mounted. The tubular axle has its outer end or spindle portion reduced to form a shoulder 3 the purpose of which will be hereinafter described. The outer end of the axle 1 is recessed longitudinally to form a plurality of locking grooves 4 and ribs 5 which will also be hereinafter described.

On the reduced portion or spindle of the stationary axle 2 is arranged an inner bearing sleeve 6 on which are revolubly mounted a series of anti-friction rollers 7 having formed therein spiral oil grooves 7ª. On the rollers is revolubly mounted an outer bearing sleeve 8. The rollers 7 are spaced apart and held in position between the sleeves 6 and 8 by rings 9 having inwardly projecting bearing cones 10 which are engaged with similarly shaped recesses in the ends of the rollers. When arranged as described, the sleeves 6 and 8 and the rollers 7 form an anti-frictional bearing for the hub and the bearing thus formed is held in position on the stationary axle 2 by a locking washer 11 arranged on the outer end of the stationary axle. The washer 11 has in one side a locking lug 12 which is engaged with one of a series of notches 13 in the end of the axle 2 whereby the washer is locked against turning. The washer 11 is also provided at a point opposite to the lug 12 with an inwardly extending sleeve locking lug 14 which is engaged with a notch 15 in the outer end of the inner bearing sleeve 6 whereby said sleeve is held against rotation.

The hub proper comprises a main outer driving member 16 consisting of an axle engaging portion 17 provided in its outer end with a socket 18 having a series of longitudinal ribs 19 and grooves 20 which are adapted to engage the grooves 4 and ribs 5 on the end of the driving axle 1 whereby the motion of the said axle is imparted to the driving member of the hub and through the same to the wheel. Around the socket 18 and spaced therefrom is an annular flange 21, the outer end of which is exteriorly threaded to receive a cap 22 whereby the outer end of the hub and axle is covered.

Formed integral with the axle engaging portion 17 of the hub member 16 is the barrel or bearing engaging portion 23 of said member, said portion fitting closely onto the outer bearing sleeve 8 and having therein an annular shoulder 24 which engages the outer end of said sleeve as shown.

On the inner end of the barrel portion 23 is formed a hollow cylindrical brake drum 25 comprising a radially projecting circular plate having on its outer edge an annular flange 26 with which is adapted to be engaged any suitable construction of brake band (not shown). The radial plate of the drum forms one side of a spoke receptacle, the other side of which is in the form of an annular spoke clamping plate 27 which is slidably mounted on the barrel portion 23 of the driving member 16 of the hub. The driving member when constructed as described, forms one unit of the hub and is the medium through which the movement of the driving axle is imparted to the wheel and through which all strain resulting from the application of the brake band to the drum is transmitted directly to the driving axle.

The spokes 28 of the wheel are clamped between the radial plate of the drum and the clamping plate 27 by a series of clamping bolts 29 arranged through said plates between the spokes, said bolts having nuts 30 on their outer ends which engage the plate 27. By thus fastening the spokes they may be readily removed and replaced without disturbing the other parts of the hub and by adjusting the clamping plate 27 spokes of different sizes may be secured to the wheel.

Revolubly mounted on the stationary axle 2 at the inner end of the bearing of the hub is an annular retaining plate 31 having a central offset portion 32 in the inner side of which is an annular chamber or recess 33. Around the edge of the recess 33 is an annular notch 34 which engages an annular offset 35 on the inner end of the barrel portion 23 of the hub. The outer portion of the plate 31 fits closely against the outer side of the radial plate of the drum and is securely fastened to said plate by the head ends of the spoke clamping bolts 29, said ends of the bolts being squared where they engage the plate 31, as shown. In the inner axle engaging edge of the plate 31 is an annular recess 36 in which is arranged a packing ring 37 which fits around and forms a dust tight engagement with the axle 2.

The end of the stationary axle 2 having the notches 13 is also exteriorly threaded and on said threaded end is screwed a hub-retaining nut 38 which engages the locking washer 11 and holds the hub in place on the axle. The nut 38 has in its edge a groove 39 and in one side has a passage 40. Engaged with the groove is a locking spring 41 having one end bent at right angles to form a nut locking pin 42 which projects through the passage 40 and is adapted to engage one of the notches 13 whereby the nut is held against casual unscrewing from the axle.

On the stationary axle 2 at the opposite end of the bearing sleeves and rollers is an end thrust bearing 43 which is designed to take up the end thrust of the hub both inwardly and outwardly. The bearing 43 is arranged in the recess 33 of the locking plate 31 and comprises an annular thrust receiving plate or ring 44 which engages the inner ends of the roller bearing sleeves 6 and 8 and has on its outer side an annular groove 45 which forms one side of a ball race, the opposite side of which is formed by an annular groove 46 in an outer thrust plate or ring 47 arranged on the axle 2. Engaged with the grooves 45 and 46 are a series of anti-friction thrust bearing balls 48 which are held in place by inner and outer rings 49 and 50 as shown. The outer thrust plate 47 has the outer corner of its inner edge beveled off as shown at 51 to engage the shoulder 3 formed by the reduced end of the axle 2. By constructing and arranging the thrust bearing 43 as herein shown and described, the inward thrust of the wheel will be received by the thrust receiving plate 44 at the point $a$ in Fig. 1, or where the plate is engaged by the inner end of the outer bearing sleeve 8 of the roller bearing. The outer thrust of the wheel will be received by the plate at the point $b$ in Fig. 1, or where the plate is engaged by the inner end of the inner bearing sleeve 6. The inward thrust of the wheel is indicated in Fig. 1 of the drawings by the arrow $x$ while the outer thrust bearing is indicated by the arrow $y$. It will thus be seen that the thrust bearing 43 serves to resist both the inner and outer thrusts of the wheel and dispenses with the necessity of providing a thrust bearing in both ends of the hub.

In the preceding description, I have described the barrel of the hub as being provided with a radial plate, which plate is integrally united with the brake drum 26, have set forth the fact that the retaining plate 31 contacts with the plate in question, that an annular spoke clamping plate 27 slides upon said barrel, that the spokes 28 are interposed between the radial plate and said plate 27, and that one series of bolts 29 passes through the plates on the two sides of the spokes, through the intervening spokes, and through said retaining plate. It may, however, be well to here further explain the advantages resulting from this construction.

In so doing, it may be first explained that it often becomes necessary to remove the spokes and rim of the wheel, as a unit, from the hub thereof, in case part of the wheel or the tire thereof has become injured, thereby allowing the application of a new wheel which may well be carried by the vehicle equipped with the invention. In order to so remove the wheel, it is simply necessary to remove the nuts from the bolts 29, thus allowing the spoke clamping plate or ring 27 to be moved outwardly from the hub, after which the spokes and the rim of the wheel may be removed as a unit.

Furthermore, it often becomes necessary to adjust and repair the various bearings within the barrel or hub. In order to accomplish this result, it is again only necessary to remove the nuts from the bolts 29, after which the entire wheel and the hub thereof may be removed from said bearings, thus allowing the proper adjustments or repairs to be readily made. It will be understood that the retaining plate 31 remains upon the fixed axle section 2, at all times, although this plate may be moved inwardly thereon to inspect or repair the thrust bearing.

In view of the preceding explanation, it will be evident that the specific structure set forth in the following claim possesses a great number of advantages, regardless of its extreme simplicity. Particular emphasis is laid upon the fact that the one series of bolts 29 secures all of the movable parts of the hub together, and that removal of the nuts on these bolts will allow disassembling in the manner above set forth, it being therefore evident that the device possesses marked advantages over devices of this general character heretofore devised, since, although such devices employ structure similar to that described and claimed by me, they do not show the specific structure which I claim as my invention.

Having thus described my invention, what I claim as new is:

The combination with a nonrotatable axle, a substantially cylindrical hub revolubly mounted on one end thereof and adapted to slide endwise therefrom, an annular thrust member on the axle adjacent the inner end of the hub, a plurality of spokes abutting the periphery of the hub and radiating therefrom, said spokes being free to slide endwise from the hub as a unit, a fixed spoke clamping ring surrounding the inner end of the hub and formed integrally therewith, and a movable spoke clamping ring surrounding the outer end of said hub to slide endwise therefrom, the spokes being disposed between the two clamping rings; of an annular retaining plate surrounding the axle and contacting with the inner end of the annular thrust member thereon, said plate also contacting with the fixed clamping ring, and a series of bolts passing removably through said retaining plate, through the fixed and movable clamping rings, and through the intervening spokes, whereby the retaining plate, the bolts, and the movable clamping rings are the sole means to retain the entire hub on the axle and for retaining the spokes on the hub.

In testimony whereof I have hereunto set my hand in presence of two subscribing witnesses.

ELMER F. ALTMAN.

Witnesses:
 HARRY RAUCH,
 G. H. SMITH.